US009353245B2

(12) United States Patent
Tien et al.

(10) Patent No.: US 9,353,245 B2
(45) Date of Patent: May 31, 2016

(54) THERMALLY CONDUCTIVE CLAY

(71) Applicant: 3M INNOVATIVE PROPERTIES COMPANY, St. Paul, MN (US)

(72) Inventors: Pei Tien, Taiwan (CN); Chao-Yuan Wang, Taiwan (CN); Mei-Chin Liao, Taiwan (CN); Wei-Yu Chen, Taiwan (CN)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/461,753

(22) Filed: Aug. 18, 2014

(65) Prior Publication Data

US 2016/0046791 A1 Feb. 18, 2016

(51) Int. Cl.
C08K 3/38 (2006.01)
C08K 3/18 (2006.01)
C08K 5/521 (2006.01)
C08K 5/01 (2006.01)
C08K 3/22 (2006.01)
C08K 3/08 (2006.01)
G06F 1/20 (2006.01)

(52) U.S. Cl.
CPC . *C08K 5/521* (2013.01); *C08K 3/08* (2013.01); *C08K 3/22* (2013.01); *C08K 5/01* (2013.01); *G06F 1/206* (2013.01); *C08K 2003/0812* (2013.01); *C08K 2003/2296* (2013.01)

(58) Field of Classification Search
CPC ............ C08K 5/521; C08K 3/22; C08K 5/01; C08K 3/08; C08K 2003/2296; C08K 2003/0812; G06F 1/206
USPC .......................................................... 524/405
See application file for complete search history.

(56) References Cited

U.S. PATENT DOCUMENTS

| 5,929,138 | A * | 7/1999 | Mercer | C08K 3/22 523/220 |
|---|---|---|---|---|
| 6,211,276 | B1 | 4/2001 | Miyahara | |
| 7,445,797 | B2 | 11/2008 | Meneghetti | |
| 7,695,817 | B2 | 4/2010 | Lin | |
| 8,808,607 | B2 | 8/2014 | Usui | |
| 2002/0066883 | A1 | 6/2002 | Tomaru | |
| 2004/0116571 | A1 | 6/2004 | Su | |
| 2004/0191503 | A1 | 9/2004 | Matayabas, Jr. | |
| 2004/0204527 | A1 | 10/2004 | Chien | |
| 2005/0004305 | A1 | 1/2005 | Yamada | |
| 2007/0031684 | A1 | 2/2007 | Anderson | |
| 2008/0199688 | A1 | 8/2008 | Ozawa | |
| 2008/0241488 | A1 | 10/2008 | Ohta | |
| 2010/0075135 | A1* | 3/2010 | Kendall | C08K 3/20 428/323 |
| 2011/0204280 | A1 | 8/2011 | Bruzda | |
| 2012/0286194 | A1 | 11/2012 | Hirano | |
| 2013/0137322 | A1 | 5/2013 | Watanabe | |

FOREIGN PATENT DOCUMENTS

| JP | H07183434 | 7/1995 |
|---|---|---|
| JP | 2002-121393 | 4/2002 |
| JP | 2004-6981 | 1/2004 |
| JP | 2006-54221 | 2/2006 |
| JP | 2006-310812 | 11/2006 |
| JP | 2008-189815 | 8/2008 |
| JP | 2008-235238 | 10/2008 |
| JP | 2009-13340 | 1/2009 |
| JP | 2009-13390 | 1/2009 |
| JP | 2010-219290 | 9/2010 |
| JP | 2010-280791 | 12/2010 |
| JP | 2011-54610 | 3/2011 |
| JP | 2011-222862 | 11/2011 |
| JP | 2011-236365 | 11/2011 |
| JP | 2012-12424 | 1/2012 |
| JP | 2012-54314 | 3/2012 |
| JP | 2012-57178 | 3/2012 |
| JP | 2012-119674 | 6/2012 |
| JP | 2012-144626 | 8/2012 |
| JP | 2012-224765 | 11/2012 |
| JP | 2012-233049 | 11/2012 |
| TW | 200829650 | 7/2008 |
| TW | 201319194 | 5/2013 |
| TW | 201336951 | 9/2013 |
| WO | 2005-013362 | 2/2005 |
| WO | 2006-019751 | 2/2006 |
| WO | WO 2006/023860 | 3/2006 |

OTHER PUBLICATIONS

Elliott, "Recursive Packing of Dense Particle Mixtures", Journal of Materials Science Letters, 2002, vol. 21, pp. 1249-1251.
"Max Therm—Thermal Interface material", Thermal Putty PP5000 Series, TennVac, URL <http://tennvac.com/Information/TDS/MaxTherm-PP5000-TDS.pdf>, 1 page.
International Search Report for International Application No. PCT/US2015/045459, dated 14, 2015.

* cited by examiner

*Primary Examiner* — Hui Chin

(57) ABSTRACT

The present invention is a thermally conductive clay including a carrier oil, a dispersant, a styrene polyolefin copolymer and thermally conductive particles.

19 Claims, No Drawings

THERMALLY CONDUCTIVE CLAY

TECHNICAL FIELD

The invention relates to thermal interface materials and their uses. In particular, this invention relates to thermally conductive clays having low thermal resistance.

BACKGROUND

In the computer industry, there is a continual movement to higher computing power and speed. Microprocessors are being made with smaller and smaller feature sizes to increase calculation speeds. Consequently, power flux is increased and more heat is generated per unit area of the microprocessor. As the heat output of the microprocessors increases, heat or "thermal management" becomes more of a challenge.

One aspect of thermal management is known in the industry as a "thermal interface material" or "TIM" whereby such a material is placed between a heat source, such as a microprocessor, and a heat dissipation device to facilitate the heat transfer. Such TIMs may be in the form of a grease, clay or a sheet-like material. These thermal interface materials are also used to eliminate any insulating air between the microprocessor and heat dissipation device.

An example of a TIM includes thermally conductive clays. Thermally conductive clays are generally "soft" with highly conformable properties. They can be easily formed and adhered to most surfaces, shapes and sizes of components using a very low compression force. Thermally conductive clays can be used to fill air gaps between components or printed circuit boards (PCBs) and heat sinks, metal enclosures and chasses. Thermally conductive clays are currently designed to provide a thermal solution for the recent trends of integrating higher frequency electronics into smaller devices.

TIMs typically are used to thermally connect a heat source to a heat spreader, that is, a thermally conductive plate larger than the heat source, in which case they are referred to as TIM Is. TIMs may also be employed between a heat spreader and a thermal dissipation device such as a cooling device or a finned heat sink in which case such TIMs are referred to as TIM IIs. TIMs may be present in one or both locations in a particular installation.

SUMMARY

In one embodiment, the present invention is a thermally conductive clay including a carrier oil, a dispersant, a styrene polyolefin copolymer and thermally conductive particles.

In another embodiment, the present invention is an electronic device including at least one heat source and the thermally conductive clay described above positioned on the at least one heat source.

In another embodiment, the present invention is a method of making a thermally conductive clay. The method includes providing carrier oil, dispersant, a styrene polyolefin copolymer, and thermally conductive particles; mixing the carrier oil and dispersant to form a mixture; mixing the styrene polyolefin copolymer into the mixture to form a clay; and mixing the thermally conductive particles into the clay.

DETAILED DESCRIPTION

The thermally conductive clays of the present invention are used as a thermal interface material and are designed to be used with, for example, a central processor unit (CPU) or a video graphics array (VGA) card. Compared to other thermal interface materials, the thermal conductive clays of the present invention exhibit high compression and conformability at very low weight loading. The high compression ratio is beneficial because it allows for a lower bond line thickness (BLT) while having the ability to reach a lower thermal impedance. The thermally conductive clays of the present invention are a non-silicone clay having a high compression ratio. In one embodiment, the thermally conductive clay has a compression ratio of about 70% at 200 kpa and a low thermal resistance of about 0.42° C.×cm2/W.

The thermally conductive clays of the present invention include a carrier oil, a dispersant, a styrene polyolefin copolymer and thermally conductive particles. The thermally conductive clays of the present invention have low thermal resistance and good thermal conductivity values. In order for the thermally conductive clay to have lower thermal resistance, the particle size of the thermally conductive particles must be balanced with the amount of carrier oil. If the particle size of the thermally conductive particles is too small, the increased surface area and interfaces may increase the thermal resistance of the thermally conductive clay. Therefore, the amount of carrier oil in the thermally conductive clay increases as the particle size of the thermally conductive particles decreases and increases as the particle size of the thermally conductive particles increases. However, the amount of carrier oil will also affect the thermal resistance of the thermally conductive clay. Too much carrier oil will increase the thermal resistance of the thermally conductive clay.

The carrier oil provides the base or matrix for the thermally conductive clay. Useful carrier oils may comprise synthetic oils or mineral oils, or a combination thereof and are typically flowable at ambient temperature. Suitable carrier oils include silicone oils and hydrocarbon based oils. Specific examples of useful hydrocarbon based carrier oils include paraffins, polyol esters, epoxides, and polyolefins or a combination thereof.

Commercially available carrier oils include HATCOL 1106, a polyol ester of dipentaerythritol and short chain fatty acids, HATCOL 3371, a complexed polyol ester of trimethylol propane, adipic acid, caprylic acid, and capric acid and HATCOL 2938, a polyol ester lubricant based on trimethylolpropane (all available from Hatco Corporation, Fords, N.J.); HELOXY 71 an aliphatic epoxy ester resin, available from Hexion Specialty Chemicals, Inc., Houston, Tex.; and SILICONE OIL AP 100, a silicone oil, available from Sigma-Aldrich, St. Louis, Mo.

The carrier oil may be present in the thermally conductive clay in an amount of up to about 12 weight percent, particularly up to about 20 weight percent and more particularly up to about 49.5 weight percent of the total composition. In other embodiments, the carrier oil may be present in an amount of at least about 0.5 weight percent, particularly at least about 1 weight percent, and more particularly at least about 2 weight percent of the total composition. The carrier oil may also be present in the thermally conductive clay of the invention in a range of between about 0.5 to about 20 weight percent, particularly between about 1 to about 15 weight percent, and more particularly between about 2 to about 12 weight percent.

Thermally conductive clays of the present invention can contain one or more dispersants. The dispersant(s) may be present in combination with the carrier oil, or may be present in the absence of carrier oil. The dispersants improve the dispersion of the thermally conductive particles (described below) in the carrier oil if present. Useful dispersants may be characterized as polymeric or ionic in nature. Ionic dispersants may be anionic or cationic. In some embodiments, the dispersant may be nonionic. Combinations of dispersants may be used, such as, the combination of an ionic and a polymeric dispersant. In some embodiments, a single dispersant is used.

Examples of useful dispersants include, but are not limited to: polyamines, sulfonates, modified polycaprolactones, organic phosphate esters, fatty acids, salts of fatty acids, polyethers, polyesters, and polyols, and inorganic dispersants such as surface-modified inorganic nanoparticles, or any combination thereof.

Examples of commercially available dispersants include those having the tradenames SOLSPERSE 24000, SOLSPERSE 16000 and SOLSPERSE 39000 hyperdispersants, available from Noveon, Inc., a subsidiary of Lubrizol Corporation, Cleveland, Ohio; EFKA 4046, a modified polyurethane dispersant, available from Efka Additives BV, Heerenveen, the Netherlands; MARVEL 1186, an oil based dispersant, available from Marvel Chemical Co. Ltd., Taipei Taiwan; RHODAFAC RE-610, an organic phosphate ester, available from Rhone-Poulenc, Plains Road, Granbury, N.J.; and ED251, a phosphate ether base, available from Kusumoto Chemicals, Ltd., Tokyo, Japan.

The dispersant is present in the thermally conductive clay in an amount of between about 0.5 and about 50 weight percent. In one embodiment, the dispersant is present up to about 5 weight percent, particularly up to about 10 weight percent and more particularly up to about 25 weight percent of the total composition. In another embodiment, the dispersant may be present in an amount of at least about 1 weight percent. The dispersant may also be present in the thermally conductive clay of the invention in a range of from between about 1 to about 5 weight percent.

To form the structure of the composition, the thermally conductive clay also includes a styrene polyolefin copolymer. The styrene polyolefin copolymer may be random or block. An example of a suitable styrene polyolefin copolymer includes, but is not limited to, styrene ethylene butylene styrene block copolymers (SEBS).

The styrene polyolefin copolymer is present in the thermally conductive clay in an amount of between about 0.5 and about 3 weight percent, between about 0.85 and about 2 weight percent and more particularly between about 0.85 and about 1.5 weight percent.

The thermally conductive clays of the present invention contain thermally conductive particles. Generally, any thermally conductive particles known to those of skill in the art can be used. Examples of suitable thermally conductive particles include, but are not limited to, those made from or that comprise diamond, polycrystalline diamond, silicon carbide, alumina, boron nitride (hexagonal or cubic), boron carbide, silica, graphite, amorphous carbon, aluminum nitride, aluminum, zinc oxide, nickel, tungsten, silver, carbon black and combinations of any of them. Although silica is listed as a thermally conductive particle, it is important to specify that fumed silica is not considered to be a useful, thermally conductive particle. Fumed silica is silica particles which have a primary particle size of less than about 200 nm that have been fused together into branched, three dimensional aggregates. The branched, three dimensional aggregates typically comprise chain-like structures.

In order for the thermally conductive clay to have lower thermal resistance, the particle size of the thermally conductive particles must be controlled to a specific size range. If the particle size is too large, it is believed that the large particle size will lead to an increased thickness of the thermal interface material, as the large particle size limits how thin the thermal interface material can be made when it is placed between two components during use. This increased thickness is thought to increase the thermal resistance of the thermal interface material. If the particle size or a fraction of the particle size in a given distribution of particles is too small, it may be difficult to fully wet and disperse the particles into the thermally conductive clay, resulting in poor flow properties of the clay. In some embodiments, the largest thermally conductive particles of the thermally conductive clay have a D50 (Vol. Average) particle size of between about 30 and about 70 microns and particularly between about 40 and about 50 microns. In some embodiments, the largest thermally conductive particles of the thermally conductive clay have a D50 (Vol. Average) particle size of between about 1 to about 3 microns. In some embodiments, smallest thermally conductive particles of the thermally conductive clay have a D50 (Vol. Average) particle size of between about 0.5 and about 5 microns.

In some embodiments, the thermally conductive clay contains at least about 80% by weight thermally conductive particles. In some embodiments, the thermally conductive clay contains at least about 25% by weight larger thermally conductive particles, for example, thermally conductive particles about 45 microns in size. In some embodiments, the thermally conductive clay contains at least about 50% by weight smaller thermally conductive particles, for example, thermally conductive particles between about 1 and about 5 microns in size.

In one embodiment, the thermally conductive particles in the thermally conductive clay contain less than about 3% by volume of particles having a particle size of 0.7 microns or less, based on the total volume of thermally conductive particles in the thermally conductive clay. A majority of the thermally conductive particles have a particle size of at least about 0.7 microns. In some embodiments, at least about 80%, about 90%, about 95%, about 97%, about 98% or about 99% by volume of the thermally conductive particles have a particle size greater than 0.7 microns, based on the total volume of thermally conductive particles in the thermally conductive clay.

In one embodiment, the thermally conductive particles used in the thermally conductive clays of the invention are a mixture of at least three distributions of thermally conductive particles. Each of the at least three distributions of thermally conductive particles have an average particle size which differs from the average particle size of the distribution above and/or below it by at least a factor of 5, and in other embodiments, at least a factor of 7.5, or at least a factor of 10, or greater than 10. For example, a mixture of thermally conductive particles may consist of: a smallest particle distribution having an average particle diameter ($D_{50}$) of 0.3 micrometers; a middle distribution having an average particle diameter ($D_{50}$) of 3.0 micrometers; and a largest distribution having an average particle diameter ($D_{50}$) of 30 micrometers. Another example may have average diameter particle distributions having average particle diameter ($D_{50}$) values of 0.03 micrometers, 0.3 micrometers, and 3 micrometers.

In one embodiment, the thermally conductive particles used in the thermally conductive clays of the invention are a mixture of at least three distributions of thermally conductive particles resulting in at least a trimodal distribution. In such a trimodal distribution, the minima between the peaks (distance between the baseline of the peaks and the lowest point of the valley between distribution peaks) may be no more than 75, 50, 20, 10 or 5 percent of the interpolated value (height) between adjacent peaks. In some embodiments, the three size distributions are essentially non-overlapping. "Essentially non-overlapping" means that the lowest point of the valley is no more than 5% of the interpolated value between adjacent peaks. In other embodiments, the three distributions have only a minimal overlap. "Minimal overlap" means that the lowest point of the valley is no more than 20% of the interpolated value between adjacent peaks.

Typically, for a trimodal thermally conductive clays, the average particle size for the smallest average diameter may range from about 0.02 to about 5.0 micrometers. Typically, the average particle size for the middle average diameter may range from about 0.10 to about 50.0 micrometers. Typically, the average particle size for the largest average diameter may range from about 0.5 to about 500 micrometers.

In some embodiments, it is desirable to provide a thermally conductive clay having the maximum possible volume fraction of thermally conductive particles that is consistent with the desirable physical properties of the resulting thermally conductive clay, for example, that the thermally conductive clay conform to the surfaces with which it is in contact and that the thermally conductive clay be sufficiently flowable to allow easy application.

With this in mind, the conductive particle distributions may be selected in accordance with the following general principles. The distribution of smallest diameter particles should have diameters that are smaller than, or nearly bridge, the expected gap between the two substrates to be thermally connected. Indeed, the largest particles may bridge the smallest gap between substrates. When the particles of the largest diameter distribution are in contact with each other, a gap or void volume between the particles will remain. The mean diameter of the middle diameter distribution may be advantageously selected to just fit within the gap or void between the larger particles. The insertion of the middle diameter distribution will create a population of smaller gaps or voids between the particles of the largest diameter distribution and the particles of the middle diameter distribution the dimensions of which may be used to select the mean diameter of the smallest distribution. In a similar fashion, desirable mean particle dimensions may be selected for fourth, fifth, or higher order populations of particles if desired.

Each distribution of thermally conductive particles may comprise the same or different thermally conductive particles in each or any of the at least three distributions. Additionally, each distribution of thermally conductive particles may contain a mixture of different types of thermally conductive particles The remaining voids may be thought of as being filled with carrier, dispersant(s) and other components with a slight excess to provide flowability. Further guidance in the selection of suitable particle distributions may be found in "Recursive Packing of Dense Particle Mixtures", Journal of Materials Science Letters, 21, (2002), pages 1249-1251. From the foregoing discussion, it will be seen that the mean diameters of the successive particle size distributions will preferably be quite distinct and well separated to ensure that they will fit within the interstices left by the previously packed particles without significantly disturbing the packing of the previously packed particles.

In one embodiment, the thermally conductive particles may be present in the thermally conductive clay of the invention in an amount of at least about 50 percent by weight. In other embodiments, the thermally conductive particles may be present in amounts of at least about 70, about 75, about 80, about 85, about 86, about 87, about 88, about 89, about 90, about 91, about 92, about 93, about 94, about 95, about 96, about 97, or about 98 weight percent. In other embodiments, the thermally conductive particles may be present in the thermally conductive clay of the invention in an amount of up to about 99, about 98, about 97, about 96, about 95, about 94, about 93, about 92, about 91, about 90, about 89, about 88, about 87, about 86, or about 85 weight percent.

The thermally conductive clay compositions of the present invention may also include additives such as, but not limited to: antiloading agents, antioxidants, leveling agents and solvents (to reduce application viscosity), for example, methylethyl ketone (MEK), methylisobutyl ketone, and esters such as butyl acetate.

In one embodiment, the thermally conductive clay includes a thixotropic agent, e.g. fumed silica. Examples of commercially available thixotropic agents include those having the tradenames CAB-O-SIL M5 and CAB-O-SIL TS-610, both available from Cabot Corporation, Boston, Mass.

In one embodiment, the thermal resistance of the thermally conductive clays of the present invention is less than about $0.15°$ C.$\times$cm$^2$/W, particularly less than about $0.13°$ C.$\times$cm$^2$/W, more particularly less than about $0.12°$ C.$\times$cm$^2$/W, more particularly less than about $0.11°$ C.$\times$cm$^2$/W and even more particularly less than about $0.10°$ C.$\times$cm$^2$/W.

The thermally conductive clays of the present invention are generally made by blending the dispersant and carrier oil together to form a mixture, adding the styrene polyolefin copolymer to the mixture to form a clay, and then blending the thermally conductive particles sequentially, finest to largest average particle size into the clay. The thermally conductive particles may also be premixed with one another, and then added to the liquid components. Heat may be added to the mixture in order to reduce the overall viscosity and aid in reaching a uniformly dispersed mixture. In some embodiments, it may be desirable to first pre-treat or pre-disperse a portion or all of the thermally conductive particles with dispersant prior to mixing the particles into the dispersant/carrier mixture. The components are then mixed at high shear. In one embodiment, the components were mixed at a high shear rate of 2,5000 rpm for about 3 minutes.

In other embodiments, the thermally conductive clay can be made by solvent casting the blended components, then drying to remove the solvent. For example, the thermally conductive clay component blend can be provided on a suitable release surface, e.g., a release liner or carrier.

In other embodiments, the thermally conductive clay can be applied to a carrier, or to the device in the intended use, with the aid of an energy source, e.g., heat, light, sound, or other known energy source.

In some embodiments, preferred combinations of materials of the present invention incorporate Hatcol 2938 and paraffin oil as the carrier, ED251 as the dispersant, SEBS as the styrene polyolefin copolymer, and a blend of zinc oxide and spherical aluminum.

The thermally conductive clays of the present invention may be used in electronic devices or microelectronic packages and may be used to assist in the dissipation of heat from a heat source, for example, an electronic die or chip to a thermal dissipation device. Electronic devices may comprise at least one heat source, for example, a die mounted on a substrate or stacked die on a substrate, a thermally conductive clay of the invention on the heat source, and may include an additional thermal dissipation device in thermal and physical contact with the die, such as, for example, a thermal spreader. A thermal spreader may also be a heat source for any subsequent thermal dissipation device. The thermally conductive clays of the invention are useful to provide thermal contact between said die and thermal dissipation device. Additionally, thermally conductive clays of the present invention may also be used in thermal and physical contact between a thermal dissipation device and a cooling device. In another embodiment, the thermally conductive clay of the present invention may be used between a heat generating device and a cooling device, that is, without using a heat or thermal spreader in between.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following example are on a weight basis.
Materials

| Abbreviation or Trade Name | Description |
|---|---|
| Hatcol 2938 | A polyol ester lubricant based on trimethylolpropane, available under the trade designation "HATCOL 2938" from Hatco Corporation, Fords, New Jersey. |
| PO1 | Paraffin oil available under the trade designation "PARAFFIN OIL" from First Chemical Co. Ltd from Taipei, Taiwan. |
| ED-251 | Polyether phosphate wettng/dispersing agent available under the trade designation "ED-251" from Kelly Chemical Corporation, Taipei, Taiwan. |
| SEBS | Styrene ethylene butylene styrene block copolymer available under the trade designation "JELLY POWDER" from First Chemical Co. Ltd from Taipei, Taiwan |
| AL45 | A spherical aluminum powder having a particle size D50 = 45 micron, available from Li-Yu Technology Company, ChungLi City, TaoYuan, Taiwan. |
| ZnO1 | A zinc oxide powder having a particle size D50 = 1.0 μm, available from Ta-Chuan Zinc Oxide Company, Yingge town, TaoYuan County, Taiwan |
| CMSO 50 | A low surface area fumed silica, available under the trade designation "CAB-O-SIL M5" from Cabot Corporation, Boston, Massachusetts. |

Test Methods, Preparation Procedures
Rating Test Method

After fabrication, thermally conductive clay samples were pressed between release liners for about 30 s at 35° C. by using a conventional press. The sample was rated as "good", if the clay had no cracking and no significant tack such that it could be cleanly removed from the release liner. The sample was rated as fair, if it released from the liner but had some tack, causing the clay surface to feel sticky. The sample was rated as poor if it cracked or had significant tack such that it could not be cleanly removed from the release liner.
Thermal Impedance and Thermal Conductivity Test Method The thermal resistance was measured according to ASTM 5470-06 using a model number LW9389 TIM Thermal Resistance and Conductivity testing apparatus available from Long Win Science and Technology Corporation, Yangmei, Taiwan. Reported values for thermal resistance were taken at a pressure 10 psi. The sample thickness was 0.55 mm.
Compression Test Method Compression of a sample (%) as a function of pressure on the sample was conducted using a model 5965 Dual Column Table Top Universal Testing System available from Instron Company, Norwood, Mass. The sample size was 10 mm×10 mm×0.7 mm and the scan rate was 0.1 mm/min. The % compression at a pressure of 220 kPa is reported.

Example 1 and Comparative Example 2 (CE-2)

The thermally conductive clay of Example 1 was prepared as follows: 7.45 parts by weight (pbw) PO1, 4.5 pbw ED-251, 1.17 pbw SEBS, 28.0 pbw AL45 and 57.3 pbw ZnO1 were mixed together using a conventional high shear mixer operating at 2,500 rpm for about 3 minutes. Generally, in the fabrication of the thermally conductive clays, the liquid component(s) were added first, followed by SEBS, and the inorganic particles were added last.

The sample was coated between conventional silicone release liners and pressed to form a sheet having a thickness of about 0.55 mm, per the procedure described in the Rating Test Method. Based on the Rating Test Method, Example 1 was rated as "good", exhibiting no cracking and releasing from the release.

Using the Thermal Impedance and Thermal Conductivity Test Method the values for the thermal resistance and thermal conductivity of Example 1 were determined, Table 1.

TABLE 1

|  | Tc (° C.) | Td (° C.) | Tavg (° C.) | P (psi) | Q (W) | R (° C./W) | I (° C. cm$^2$/W) | K (W/m ° C.) |
|---|---|---|---|---|---|---|---|---|
| Ex. 1 | 80.01 | 75.37 | 77.69 | 10.04 | 71.24 | 0.065 | 0.420 | 5.05 |

For comparison, a commercially available thermal interface material, available under the trade designation XR-E SERIES, 200X-HE, from Fuji Polymer Industries Co., Ltd., Taipei City, Taiwan, designated as Comparative Example 2, had a thermal impedance of about 3.0° C. cm$^2$/W and a thermal conductivity of about 11 W/m ° C., based on trade literature. The lower thermal impedance of Example 1 relative to CE-2 indicates improved thermal performance of Example 1

Using the Compression Test Method, the % compression at 220 KPa load was measured. For Example 1, the value was about 70%, for CE-2 the value was about 42%. This indicated that the thermally conductive clay can be compressed to a greater amount at the same pressure, which is expected to lead to a decrease in the thickness of the thermally conductive clay during use and improve the heat transfer.

Examples 3 through 6 and Comparative Examples (CEs) 7 through 10

Examples 3 through 6 and CEs 7 through 10 were prepared similarly to Example 1, except for modification of the formulations. The specific formulations are shown in Table 2 below. Based on the Rating Test Method, each sample was given a rating, Table 2.

TABLE 2

| (Values in weight %) | | | | | | | | |
|---|---|---|---|---|---|---|---|---|
| | Ex. 3 | Ex. 4 | Ex. 5 | Ex. 6 | CE-7 | CE-8 | CE-9 | CE-10 |
| Hatcol 2938 | 0.66 | 0.79 | 0.99 | 1.38 | 0.00 | 0.79 | 0.32 | 0.00 |
| PO1 | 6.31 | 7.41 | 7.88 | 6.79 | 7.68 | 7.49 | 7.18 | 6.54 |
| ED-251 | 4.57 | 4.60 | 4.57 | 4.53 | 4.64 | 4.60 | 4.57 | 4.62 |
| SEBS | 1.18 | 0.87 | 0.99 | 1.38 | 0.64 | 0.79 | 0.65 | 0.65 |
| AL45 | 28.57 | 28.77 | 28.59 | 28.36 | 29.01 | 28.77 | 28.56 | 28.86 |
| ZnO1 | 57.14 | 57.55 | 57.18 | 56.73 | 58.03 | 57.55 | 57.14 | 57.73 |
| CMSO 50 | 1.58 | 0.00 | 0.00 | 1.56 | 0.00 | 0.00 | 1.58 | 1.59 |
| Rating | Good | Fair [a] | Fair [a] | Good | Poor [b] | Poor [c] | Poor [c] | Poor [c] |

[a] Slight tack.
[b] Cracked.
[c] Significant tack, could not be cleanly removed from the release liner.

From the information of Table 2, formulations having SEBS values of about 0.80 wt. % and greater yielded acceptable thermally conductive clays.

Although the present invention has been described with reference to preferred embodiments, workers skilled in the art will recognize that changes may be made in form and detail without departing from the spirit and scope of the invention.

The invention claimed is:

1. A thermally conductive clay comprising:
   a carrier oil;
   a dispersant;
   a styrene polyolefin copolymer in an amount of between about 0.85 and about 2.0 weight percent of the thermal conductive clay; and
   thermally conductive particles.

2. The thermally conductive clay of claim 1, wherein the carrier oil is one of a hydrocarbon based carrier oil and a silicone oil.

3. The thermally conductive clay of claim 1, wherein when the carrier oil is a hydrocarbon based carrier oil, the carrier oil is selected from the group consisting of: polyol esters, epoxides, and polyolefins or a combination thereof.

4. The thermally conductive clay of claim 1, further comprising a thixotropic agent.

5. The thermally conductive clay of claim 1, wherein the thermally conductive particles comprise materials selected from the group consisting of: diamond, polycrystalline diamond, silicon carbide, alumina, boron nitride (hexagonal or cubic), boron carbide, silica, graphite, amorphous carbon, aluminum nitride, aluminum, zinc oxide, nickel, tungsten, silver, and combinations thereof.

6. The thermally conductive clay of claim 1, wherein the largest thermally conductive particles have a D50 (Vol. Average) particle size of between about 30 and about 70 microns.

7. The thermally conductive clay of claim 1, wherein the largest thermally conductive particles have a D50 (Vol. Average) particle size of between about 40 and about 50 microns.

8. The thermally conductive clay of claim 1, wherein the smallest thermally conductive particles have a D50 (Vol. Average) particle size of between about 0.5 and about 5 microns.

9. The thermally conductive clay of claim 1, wherein the largest thermally conductive particles have a D50 (Vol. Average) particle size of between about 1 and about 3 microns.

10. The thermally conductive clay of claim 1, wherein the thermally conductive clay contains at least about 80% by weight thermally conductive particles.

11. An electronic device comprising:
    at least one heat source; and
    the thermally conductive clay of claim 1 on the at least one heat source.

12. The electronic device of claim 11, further comprising a heat spreader, wherein the thermally conductive clay is positioned between the heat source and the heat spreader.

13. The electronic device of claim 12, further comprising a heat dissipation device, wherein the thermally conductive clay is positioned between the heat spreader and the heat dissipation device.

14. A method of making a thermally conductive clay comprising:
    providing carrier oil, dispersant, a styrene polyolefin copolymer, and thermally conductive particles, wherein the styrene polyolefin copolymer is present in an amount of between about 0.85 and about 2.0 weight percent of the thermal conductive clay;
    mixing the carrier oil and dispersant to form a mixture;
    mixing the styrene polyolefin copolymer into the mixture to form a clay; and
    mixing the thermally conductive particles into the clay.

15. The thermally conductive clay of claim 14, wherein the largest thermally conductive particles have a D50 (Vol. Average) particle size of between about 30 and about 70 microns.

16. The thermally conductive clay of claim 14, wherein the largest thermally conductive particles have a D50 (Vol. Average) particle size of between about 40 and about 50 microns.

17. The thermally conductive clay of claim 14, wherein the smallest thermally conductive particles have a D50 (Vol. Average) particle size of between about 0.5 and about 5 microns.

18. The thermally conductive clay of claim 14, wherein the largest thermally conductive particles have a D50 (Vol. Average) particle size of between about 1 to about 3 microns.

19. The thermally conductive clay of claim 14, wherein the thermally conductive clay contains at least about 80% by weight thermally conductive particles.

* * * * *